United States Patent
Moreno et al.

(10) Patent No.: US 10,476,700 B2
(45) Date of Patent: Nov. 12, 2019

(54) TECHNIQUES FOR INTERCONNECTION OF CONTROLLER- AND PROTOCOL-BASED VIRTUAL NETWORKS

(71) Applicant: CISCO TECHNOLOGY, INC., San Jose, CA (US)

(72) Inventors: Victor Manuel Moreno, Carlsbad, CA (US); Padmanabhan Krishnan, Fremont, CA (US); Nilesh Shah, Fremont, CA (US); Suvil Singh Deora, Bellevue, WA (US); Shyam Kapadia, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 189 days.

(21) Appl. No.: 15/228,899

(22) Filed: Aug. 4, 2016

(65) Prior Publication Data

US 2018/0041363 A1     Feb. 8, 2018

(51) Int. Cl.
*H04L 12/66* (2006.01)
*H04L 12/46* (2006.01)
(Continued)

(52) U.S. Cl.
CPC ...... *H04L 12/4641* (2013.01); *H04L 12/4633* (2013.01); *H04L 12/66* (2013.01);
(Continued)

(58) Field of Classification Search
None
See application file for complete search history.

(56) References Cited

U.S. PATENT DOCUMENTS

| 7,522,600 B1 * | 4/2009 | Aggarwal | H04L 12/18 370/256 |
| 9,137,116 B1 * | 9/2015 | Rijsman | H04L 41/12 |

(Continued)

OTHER PUBLICATIONS

International Search Report and Written Opinion in corresponding International Application No. PCT/US2017/043835, dated Oct. 16, 2017, 15 pages.

(Continued)

*Primary Examiner* — Sargon N Nano
*Assistant Examiner* — Christopher B Robinson (57) ABSTRACT

In one embodiment a method includes receiving a first message including information regarding a first host connected to a first tunnel endpoint in a first network domain, the received information being encoded in accordance with a control plane protocol of the first network domain; translating the received first message in accordance with an API and/or a database schema of a second network domain; and transmitting the translated first message to the second network domain. The method further includes receiving a second message comprising information regarding a second host connected to a second tunnel endpoint in the second network domain, the received information being encoded in accordance with the API and/or the database schema of the second network domain; translating the second received message in accordance with the control plane protocol of the first network domain; and transmitting the translated second message to the first network domain.

20 Claims, 7 Drawing Sheets

(51) Int. Cl.
*H04L 29/08* (2006.01)
*H04L 12/24* (2006.01)

(52) U.S. Cl.
CPC ........ *H04L 41/022* (2013.01); *H04L 41/0226* (2013.01); *H04L 67/02* (2013.01); *H04L 67/10* (2013.01); *H04L 2212/00* (2013.01)

(56) References Cited

U.S. PATENT DOCUMENTS

| | | | |
|---|---|---|---|
| 9,178,801 B1* | 11/2015 | Guichard | H04L 12/6418 |
| 2006/0002370 A1 | 1/2006 | Rabie et al. | |
| 2006/0133390 A1* | 6/2006 | Sreekantiah | H04L 45/02 370/401 |
| 2007/0226320 A1* | 9/2007 | Hager | G06F 16/137 709/219 |
| 2008/0052356 A1* | 2/2008 | Johnson | H04L 67/12 709/204 |
| 2008/0077710 A1* | 3/2008 | Kouvelas | H04L 12/1854 709/250 |
| 2008/0279196 A1 | 11/2008 | Friskney et al. | |
| 2008/0310417 A1 | 12/2008 | Friskney et al. | |
| 2010/0287227 A1* | 11/2010 | Goel | H04L 67/1002 709/202 |
| 2013/0077495 A1 | 3/2013 | Friskney et al. | |
| 2013/0315244 A1 | 11/2013 | Rabie et al. | |
| 2015/0016262 A1 | 1/2015 | Friskney et al. | |
| 2015/0244617 A1* | 8/2015 | Nakil | G06F 9/45558 709/224 |
| 2015/0256455 A1* | 9/2015 | Suzuki | H04L 45/74 370/392 |
| 2015/0350077 A1 | 12/2015 | Durrani et al. | |

OTHER PUBLICATIONS

P. Mohapatra, et al., "The BGP Encapsulation Subsequent Address Family Identifier (SAFI) and the BGP Tunnel Encapsulation Attribute", Network Working Group, Apr. 1, 2009, RFC 5512, 13 pages.

* cited by examiner

TECHNIQUES FOR INTERCONNECTION OF CONTROLLER- AND PROTOCOL-BASED VIRTUAL NETWORKS

TECHNICAL FIELD

This disclosure relates in general to the field of computer networking and, more particularly, to techniques for interconnection of controller- and protocol-based virtual networks.

BACKGROUND

The creation of virtual networks using overlays has become a pervasive practice in the networking space. The industry offers diverse, and often incompatible, solutions. There are mainly two categories of solutions based on the control plane model employed: controller-based and protocol-based. Controller-based solutions employ a central database from which host reachability information is pushed to the tunnel end-points of the virtual network. Examples of controller-based solutions include VTS, Nuage, and NSX virtual networking solutions and their use of OVSDB and OpenFlow with its vendor-specific extensions. Protocol-based solutions employ a distributed model in which all involved network elements participate in a well understood protocol to calculate and disseminate the relevant reachability information. Examples of protocol-based solutions include BGP-EVPN-VXLAN overlays and LISP Overlays. Controller-based and protocol-based solutions are inherently incompatible due to the manner in which each distributes reachability and data plane encapsulation capability information.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided and in one embodiment includes receiving a first message comprising information regarding a first host connected to a first tunnel endpoint in a first network domain, wherein the received information is encoded in accordance with a control plane protocol of the first network domain; translating the received first message in accordance with at least one of an API and a database schema of a second network domain; and transmitting the translated first message to the second network domain. The method further includes receiving a second message comprising information regarding a second host connected to a second tunnel endpoint in the second network domain, wherein the received information is encoded in accordance with at least one of the API and the database schema of the second network domain; translating the second received message in accordance with the control plane protocol of the first network domain; and transmitting the translated second message to the first network domain.

In certain embodiments, the information regarding the first host includes reachability information and data encapsulation capabilities of the first host and wherein the information regarding the second host includes reachability information and data encapsulation capabilities of the second host. The translating the first message may include extracting from the received first message the reachability information and the data encapsulation capabilities of the first host; and encoding the extracted reachability information and the data encapsulation capabilities of the first host in accordance with at least one of the API and the database schema of the second network domain. Similarly, the translating the second message may include extracting from the received second message the reachability information and the data encapsulation capabilities of the second host; and encoding the extracted reachability information and the data encapsulation capabilities of the first second in accordance with the control plane protocol of the first network domain. The transmitting the translated first message may include writing the translated reachability information and data encapsulation capabilities to a database of the second network domain in accordance with the database schema. Similarly, the transmitting the translated second message may include advertising the translated reachability information and data encapsulation capabilities for the second host in the first network domain in accordance with the control plane protocol.

In some embodiments, the first network domain is implemented as a distributed network protocol-based network and the second network domain is implemented as a central controller-based network.

Example Embodiments

Embodiments described herein enable interoperability of controller-based and protocol-based control plane models to allow the creation of hybrid virtual networks in which some of the overlay end points may rely on a controller while others may utilize a protocol to procure the necessary reachability information. Certain embodiments may enable integration of multiple controller and multiple control plane virtual network domains into a unified virtual network. One embodiment is a method for enabling interoperability of central controller-based virtual networks and distributed network protocol-based virtual networks. Interoperability may be achieved by translating and disseminating reachability information between the disparate control planes, or domains, and exchanging data plane capabilities between the domains to negotiate a common data plane protocol between the domains. The translated information is delivered to the virtual network overlay end points in each domain so that traffic can be tunneled directly between the end points based on the end points having complete reachability information for destinations in their own domain or any peer domain and using a common data plane encapsulation method negotiated amongst the end points themselves.

Within a controller-based virtual network domain, host reachability information is consolidated in a central database and pushed to the network edge devices using database access interfaces and protocols, such as OVSDB or any other data base API. In the central database scenario, the network edge devices do not participate in the calculation, population, maintenance, or organization of the reachability information in the database; they simply read from the database as necessary. In a distributed network protocol-based virtual network domain, host reachability information is calculated by a distributed set of network nodes and coordinated using a network protocol running on all involved network devices. In the network protocol-based model, a distributed data set is maintained across the involved network devices. Different network devices will be authoritative for different portions of the data set and its calculation. The calculation of reachability must take into consideration information received from other participants via the network control protocol. Such a distributed system enables the topology awareness, scale and resiliency characteristics inherent to networking behavior.

Figure 1:
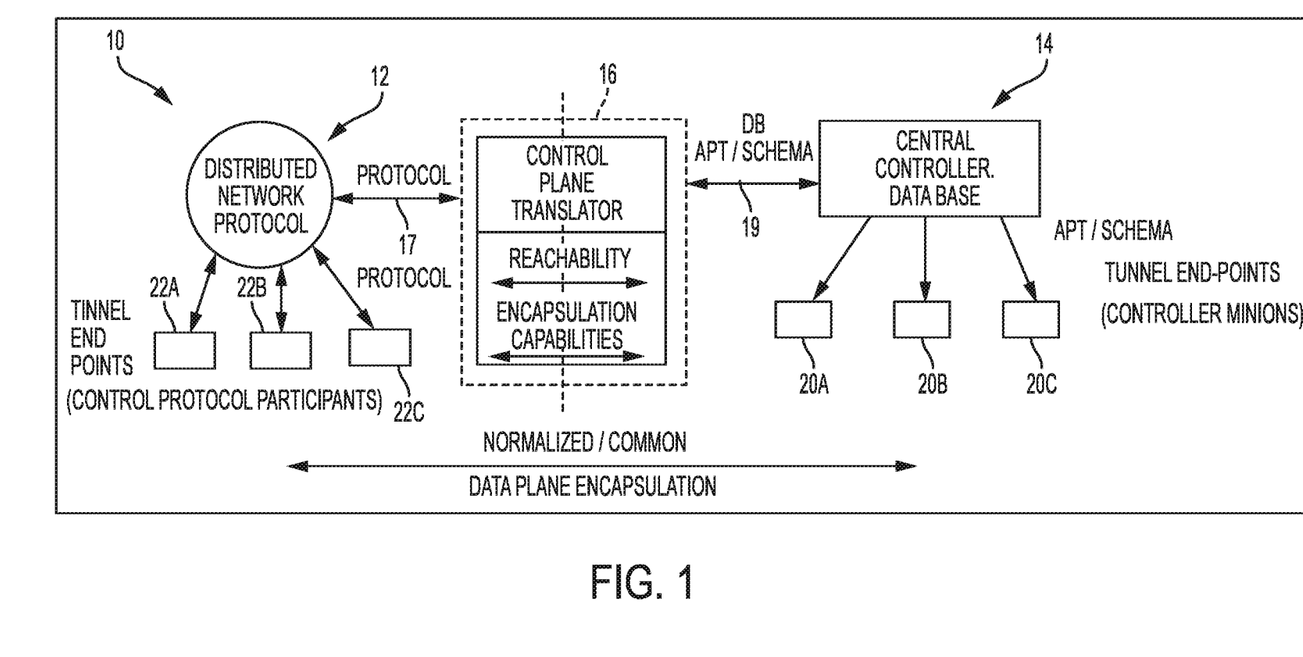
FIG. 1 is a simplified block diagram of a data communications environment including features of embodiments described herein for interconnection of controller-based virtual networks and protocol-based virtual networks.

Referring to FIG. 1, illustrated therein is a hybrid communications network 10 including features of embodiments described herein for interconnection of controller-based virtual networks and protocol-based virtual networks. As shown in FIG. 1, and as will be described in greater detail below, the communications network 10 includes a distributed network protocol domain 12 and a central controller domain 14 interconnected via a control plane translator 16. As will also be described in greater detail below, the control plane translator 16 may function as a broker between the distributed network protocol domain 12 and the central controller domain 14. In accordance with features of embodiments described herein, the control plane translator 16 handles two main types of information, including host reachability (or simply reachability) and end point encapsulation capability. It will be recognized that these two types of information are structured and communicated very differently in each of the domains 12, 14. The control plane translator 16 is capable of participating in the network protocols of the distributed network protocol domain 12 following protocol rules for the domain (as represented in FIG. 1 by an arrow designated by a reference numeral 17) and of reading from and writing to a database 18 of the central controller domain 14 using APIs and published schema for the database (as represented in FIG. 1 by an arrow designated by a reference numeral 19).

In accordance with features of embodiments described herein, the control plane translator 16 performs translation of host reachability information between the domains 12, 14. In particular, the control plane translator 16 may present to the distributed network protocol domain 12 network protocols including reachability information for hosts connected to tunnel end points 20A-20C in the central controller domain 14. In performing this function, the control plane translator 16 will serve as a protocol proxy for the tunnel end points 20A-20C of the central controller domain 14, which end points may also be referred to as "controller minions," and will present the reachability information to tunnel end points 22A-22C of the distributed network protocol domain 12 as it would have been presented if the end points 20A-20C had participated directly in the protocol. Additionally, host reachability information learned for hosts connected to the tunnel end points 22A-22C of the distributed network protocol domain 12 will be written to the controller database 18 using the available APIs and published schemas. This completes the information in the controller database so that the controller minions will receive a set of reachability information that includes the hosts attached to the tunnel end points in the network protocol domain.

The control plane translator 16 also facilitates translation and exchange of dataplane encapsulation capabilities between the domains 12, 14. This exchange is aimed at ensuring that a common data plane encapsulation is available and used across the disparate domains. Data plane capabilities from the central controller domain 14 will be translated from the database schema and advertised in the distributed network protocol domain 12 along with the host reachability information as an attribute of the advertised route. This type of information is accommodated in protocols like BGP in extended community attributes and LISP by the use of the LISP Canonical Address Family ("LCAF"). Data plane capabilities from the distributed network protocol domain 12 will be translated to the central controller domain 14 database schemas and written to the database 18 along with the translated host reachability information.

Figure 2:
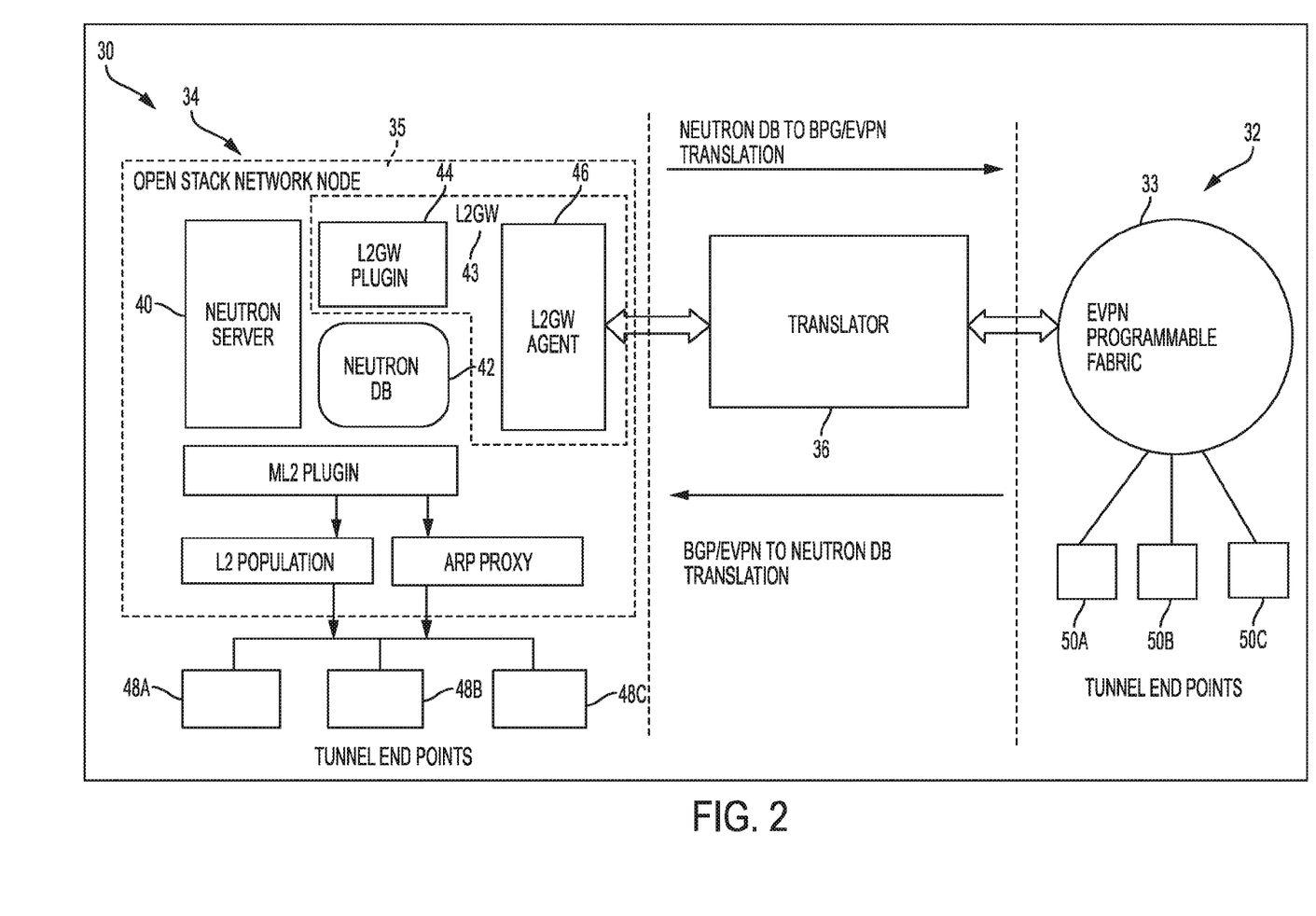
FIG. 2 is a simplified block diagram of a data communications environment configured to illustrate a first use case of embodiments described herein for interconnection of controller-based virtual networks and protocol-based virtual networks.
Figure 3:
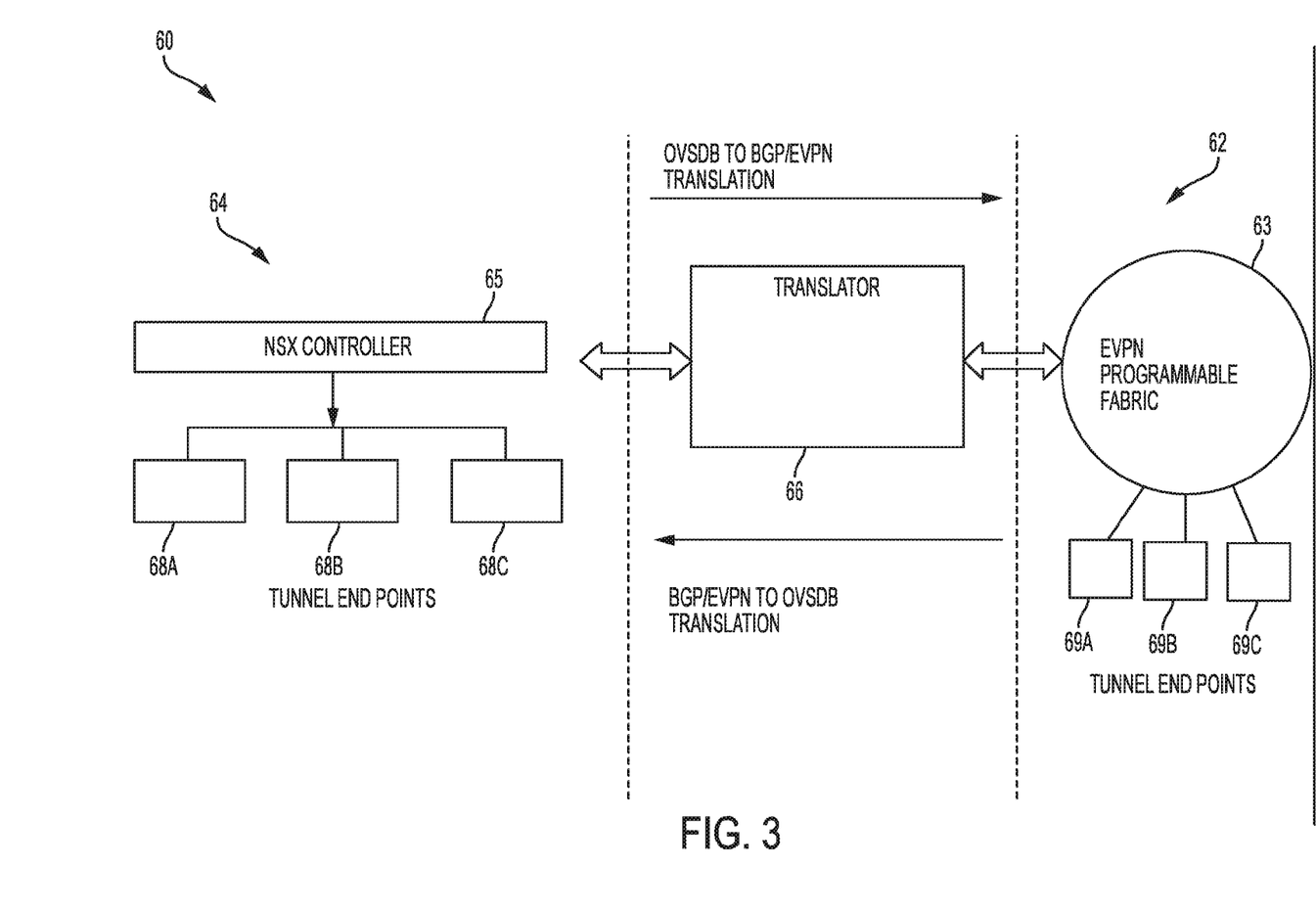
FIG. 3 is a simplified block diagram of a data communications environment configured to illustrate a second use case of embodiments described herein for interconnection of controller-based virtual networks and protocol-based virtual networks.

FIGS. 2 and 3 respectively illustrate use cases of embodiments described herein for interconnection of controller-based virtual networks and protocol-based virtual networks. Referring to FIG. 2, illustrated therein is a hybrid communications network 30 including features of embodiments described herein for interconnection of controller-based virtual networks and protocol-based virtual networks. In the use case illustrated in FIG. 2, the communications network 30 includes a distributed network protocol domain 32, which in the illustrated embodiment is implemented as a BGP-EVPN programmable fabric 33, and a central controller domain 34, which in the illustrated embodiment is implemented using an OpenStack network node 35, interconnected via a control plane translator 36. In the illustrated embodiment, the OpenStack network node 35 is implemented as a neutron server 40 and neutron database ("DB") 42 and is configured to use VXLAN host overlays with an L2 gateway ("L2GW") 43 (implemented as L2GW plugin 44 and L2GW agent 46). The translator 36 provides reachability and capability information between an OpenStack-managed cluster of tunnel end points 48A-48C and nodes of EVPN fabric 33 by obtaining the BGP reachability information from the EVPN programmable fabric, parsing and translating it, and writing it to the neutron DB 42 through the L2GW. Similarly, reachability information for tunnel end points 48A-48C from the Neutron DB 42 is obtained by the translator 36 through the L2GW 43, translated, and fed to a BGP Route Reflector ("RR") of EVPN programmable fabric 33 from which it is distributed to tunnel end points 50A-50C in a conventional fashion.

Referring to FIG. 3, illustrated therein is a hybrid communications network 60 including features of embodiments described herein for interconnection of controller-based virtual networks and protocol-based virtual networks. In the use case illustrated in FIG. 3, the communications network 60 includes a distributed network protocol domain 62, which in the illustrated embodiment is implemented as a BGP-EVPN programmable fabric 63, and a central controller domain 64, which in the illustrated embodiment is implemented using an NSX controller 65, interconnected via a control plane translator 66. It will be assumed for the sake of example that NSX controller 65 uses OVSDB for managing a cluster of tunnel end points 68A-68C. In the embodiment shown in FIG. 3, the translator 66 provides reachability and capability information between the NSX controller 65 and EVPN fabric 63/tunnel endpoints 69A-69C in a manner similar to that described above with reference to FIG. 2 except that it translates to/from OVSDB instead of neutron DB.

Figure 4:
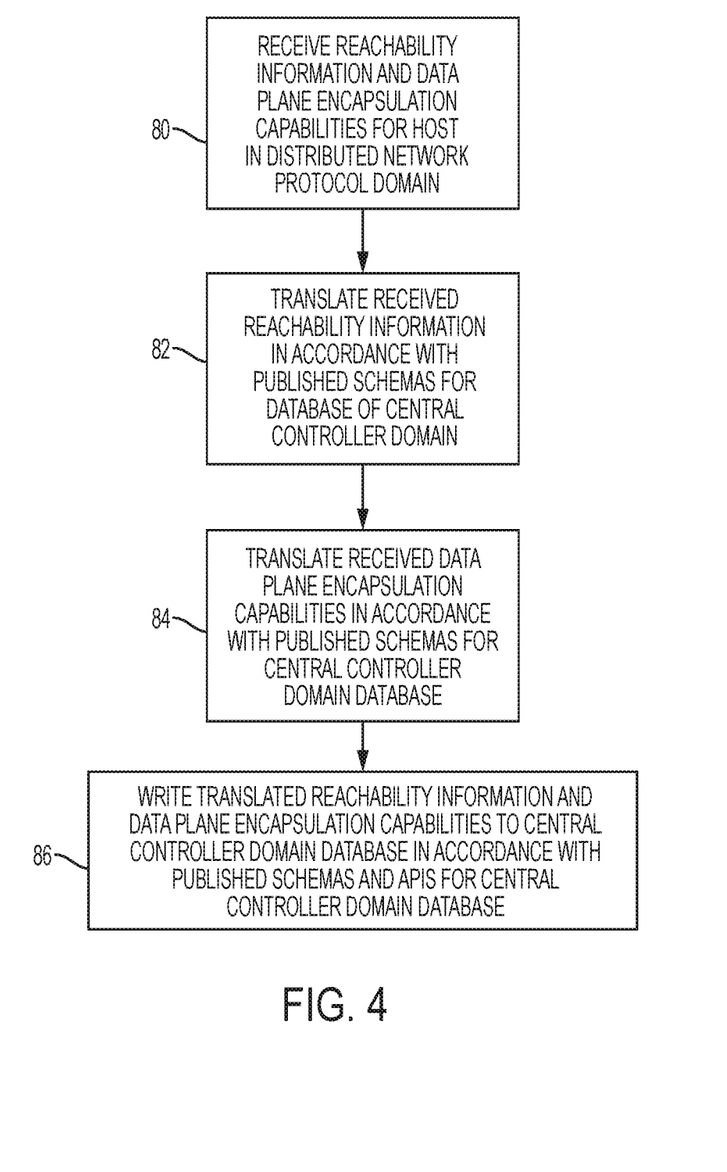
FIG. 4 is a flowchart illustrating steps of a method that may be implemented by a translator disposed in a data communications environment for interconnection of controller-based virtual networks and protocol-based virtual networks in accordance with embodiments described herein.

FIG. 4 is a flowchart illustrating operation of embodiments described herein for interconnection of controller-based virtual networks and protocol-based virtual networks. Referring to FIG. 4, in step 80, a translator disposed between a distributed network protocol domain and a central controller domain, such as the translator 16 (FIG. 1), that is participating in and following the rules of the network protocol of the network protocol domain receives reachability information (e.g., Network Layer Reachability Information ("NLRI")) and data plane encapsulation capabilities for a host connected to a tunnel end point in the distributed network protocol domain. In particular, the translator may participate in the network protocol as a listener. The network protocol includes in its messages reachability information as well as encapsulation capabilities information on a per-host basis. The translator receives this information periodically by listening to the network protocol messages.

In step 82, the translator extracts the reachability information received in the distributed protocol messages, removes any encoding specific to the network protocol and encodes the raw extracted information in accordance with the published schemas for a database of the central controller domain. In general, the translation may be performed by taking the base information set and encoding it either in accordance with the database schemas or in accordance with the control protocol message structure.

In step 84, the translator extracts the data plane encapsulation capabilities of the host received in the distributed protocol messages, removes any encoding specific to the network protocol and encodes the raw extracted information in accordance with the published schemas for a database of the central controller domain. In step 86, the translator writes the translated reachability information and data plane encapsulation capabilities to the central controller domain database in accordance with the available APIs and published schema for the database. As a result, the central controller domain tunnel end points will receive a set of reachability information and data plane encapsulation capabilities for hosts attached to tunnel end points in the distributed network protocol domain, enabling the former to communicate with the latter as if they were all located within the central controller domain (from the perspective of the central controller domain tunnel end points).

Figure 5:
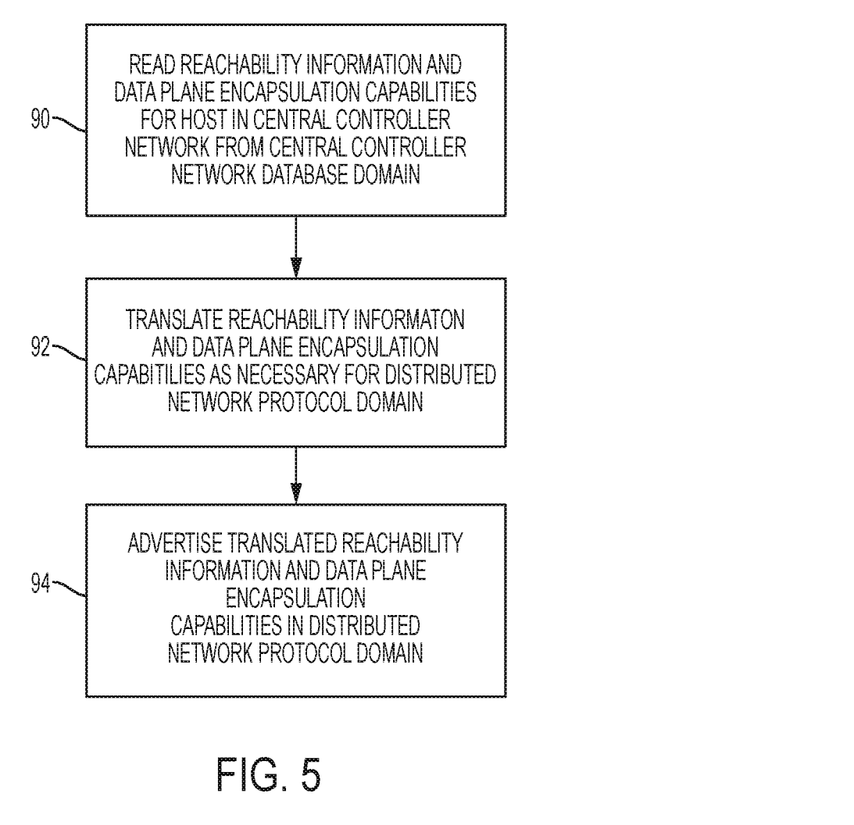
FIG. 5 is a flowchart illustrating steps of a method that may be implemented by a translator disposed in a data communications environment for interconnection of controller-based virtual networks and protocol-based virtual networks in accordance with embodiments described herein.

FIG. 5 is a flowchart illustrating operation of embodiments described herein for interconnection of controller-based virtual networks and protocol-based virtual networks. Referring to FIG. 5, in step 90, a translator disposed between a distributed network protocol domain and a central controller domain, such as the translator 16 (FIG. 1), that is capable of reading from and writing to a database of the central controller domain using APIs and published schema for the database, reads reachability information and data plane encapsulation capabilities from the database. The central controller, which will usually push updates to all its listeners as information changes, may trigger this read. In an alternate embodiment, the translator may poll the central controller database periodically. In step 92, the translator translates the reachability information and data plane encapsulation capabilities in whatever manner necessary. In particular, the translator may extract the reachability information received in the update, removes any encoding specific to the APIs or published schemas for the database of the central controller domain, and encode raw extracted information in accordance with the protocol of the protocol-based domain. In step 94, the translator advertises in the distributed network protocol domain the translated reachability information and data plane encapsulation capabilities for hosts in the central controller domain. In this aspect, the translator serves as a protocol proxy for tunnel end points in the central controller domain and will present the reachability information as it would have been presented if the central controller domain tunnel end points were participating directly in the protocol of the distributed network protocol domain. The data plane capabilities may be advertised with the host reachability information as an attributed of the advertised route.

In summary, as described herein, a method is proposed to enable interoperability of controller- and protocol-based virtual networks, which are otherwise incompatible. Interoperability is achieved by translating and disseminating reachability information between the disparate control planes (domains) and exchanging data plane capabilities between the domains to negotiate a common data plane protocol between the domains.

No changes or special provisions are required on any of the virtual networks in either domain and the translator can be inserted seamlessly and transparently into any domain. Tunnel end points remain unaware that they are receiving traffic and routes from and sending traffic and routes to tunnel end points in another domain. Additionally, no changes or augmentations are required to implement the embodiments described herein in either type of domain. The solution is implemented exclusively in the control plane and the negotiation of a normalized data plane prevents the need for any data plane gateways, which would create suboptimal data plane bottlenecks, and allows an optimal integration of domains into a single hybrid virtual network. Moreover, because the solution is transparent to domains and is optimal, it provides an answer to issues of cross-vendor interoperability in virtual networking space.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 6:
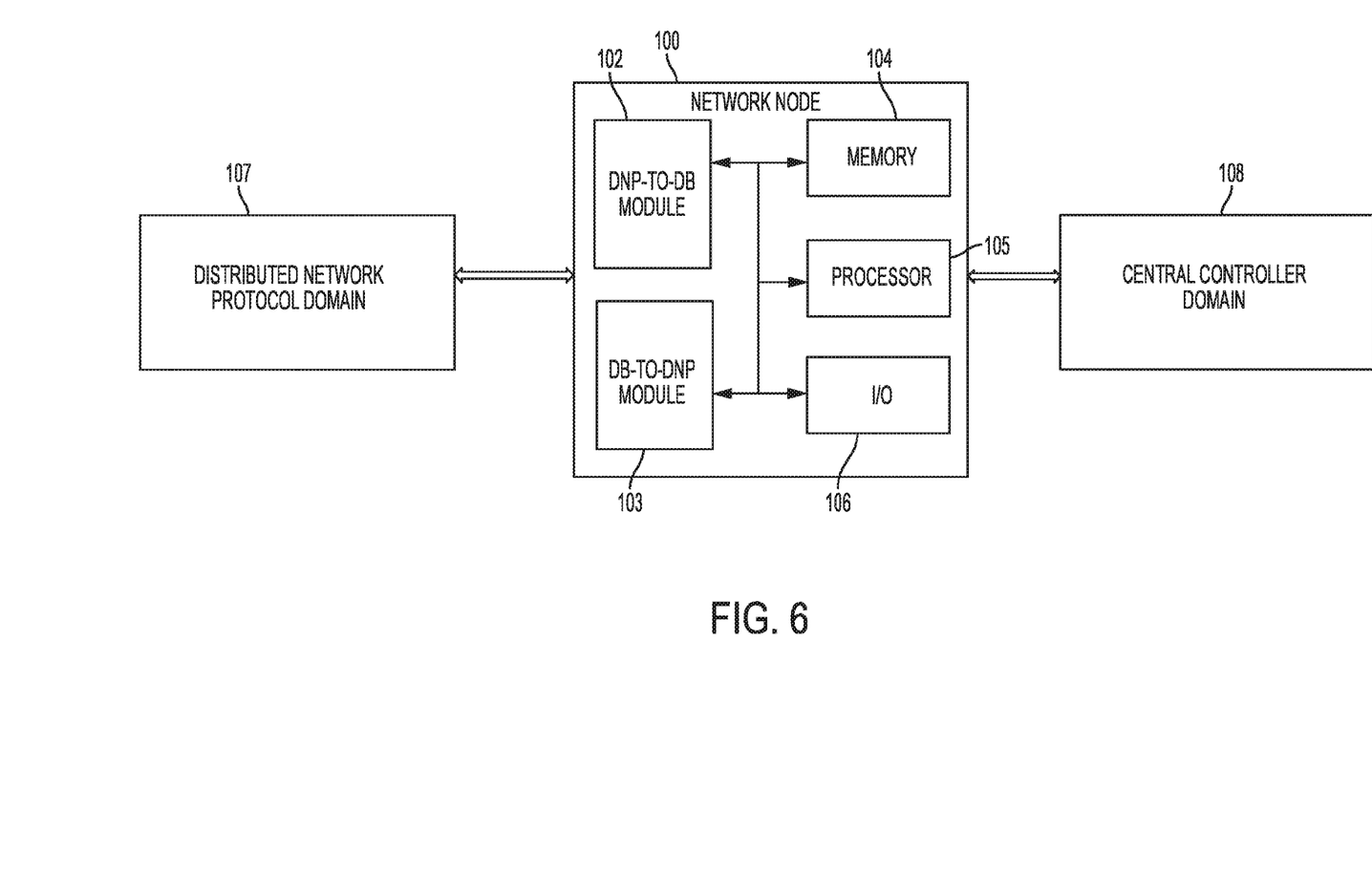
FIG. 6 is a simplified block diagram of a network node comprising a translator configured to facilitate interconnection of controller-based virtual networks and protocol-based virtual networks in accordance with embodiments described herein.

For example, referring to FIG. 6, a network node, or element, 100, which may be implemented as a translator, such as translator 12 (FIG. 1) may include a distributed network protocol-to-controller database ("DNP-to-DB") module 102 and a controller database-to-distributed network protocol ("DB-to-DNP") module 103, each comprising software embodied in one or more tangible media for facilitating the activities described herein. In particular, the DNP-to-DB module 102 may comprise software for facilitating the processes illustrated in and described with reference to FIG. 4, while the DB-to-DNP module may comprise software for facilitating the processes illustrated in and described with reference to FIG. 5. The node 100 may also include a memory device 104 for storing information to be used in achieving the functions as outlined herein. Additionally, the node 100 may include a processor 105 that is capable of executing software or an algorithm (such as embodied in modules 102 and 103) to perform the functions as discussed in this Specification. The node 100 may also include various I/O 106 necessary for performing functions described herein. As described with reference to FIG. 1, inter alia, the node 100 is functionally connected to elements of a distributed network protocol domain 107 and to elements of a central controller domain 108.

It will be recognized that the node 100 of FIG. 6 may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 4 and 5. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 4 and 5 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 4 and 5. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 7:
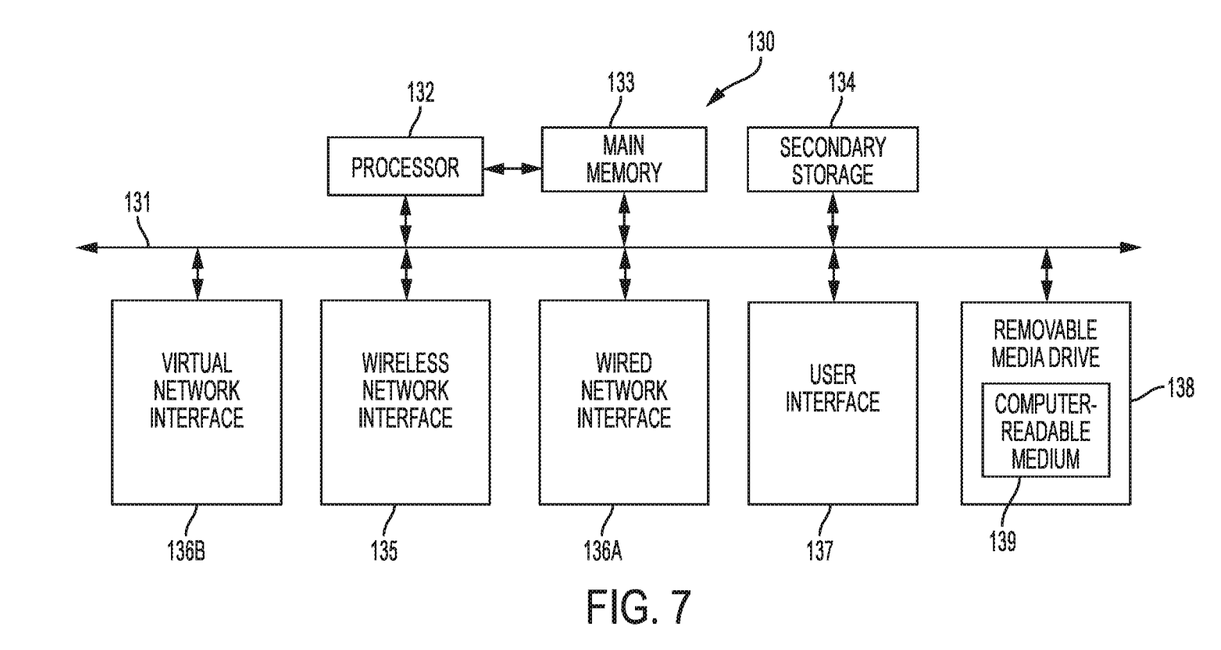
FIG. 7 is a simplified block diagram of a machine comprising an element of a communications network in which techniques for successful integration of blade switches with programmable fabric in accordance with embodiments described herein may be implemented.

Turning to FIG. 7, FIG. 7 illustrates a simplified block diagram of an example machine (or apparatus) 130, which in certain embodiments may be a translator, such as translator 12 (FIG. 1), that may be implemented in embodiments described herein. The example machine 130 corresponds to network elements and computing devices that may be deployed in a communications network, such as a classifier or a forwarding element. In particular, FIG. 7 illustrates a block diagram representation of an example form of a machine within which software and hardware cause machine 130 to perform any one or more of the activities or operations discussed herein. As shown in FIG. 7, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 7 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    obtaining a first message comprising reachability information and data encapsulation capabilities of a first host connected to a first tunnel endpoint in a first network domain, wherein the reachability information and data encapsulation capabilities of the first host are encoded in accordance with a control plane protocol of the first network domain;
    extracting from the first message the reachability information and data encapsulation capabilities of the first host;
    encoding the reachability information and data encapsulation capabilities of the first host in accordance with at least one of an Application Programming Interface (API) and a database schema of a second network domain;
    providing the first message to the second network domain by writing the reachability information and data encapsulation capabilities of the first host to a central controller database of the second network domain in accordance with at least one of the API and the database schema of the second network domain;
    obtaining a second message comprising reachability information and data encapsulation capabilities of a second host connected to a second tunnel endpoint in the second network domain, wherein the reachability information and data encapsulation capabilities of the second host are encoded in accordance with at least one of the API and the database schema of the second network domain;
    extracting from the second message the reachability information and data encapsulation capabilities of the second host;
    encoding the reachability information and data encapsulation capabilities of the second host in accordance with the control plane protocol of the first network domain; and
    providing the second message to the first network domain.

2. The method of claim 1, wherein the providing the second message comprises:
    advertising the reachability information and data encapsulation capabilities of the second host in the first network domain in accordance with the control plane protocol.

3. The method of claim 1, wherein the first network domain comprises a distributed network protocol-based network.

4. One or more non-transitory tangible media that includes code for execution and when executed by a processor is operable to perform operations comprising:
    obtaining a first message comprising reachability information and data encapsulation capabilities of a first host connected to a first tunnel endpoint in a first network domain, wherein the reachability information and data encapsulation capabilities of the first host are encoded in accordance with a control plane protocol of the first network domain;
    extracting from the first message the reachability information and data encapsulation capabilities of the first host;
    encoding the reachability information and data encapsulation capabilities of the first host in accordance with at least one of an Application Programming Interface (API) and a database schema of a second network domain;
    providing the first message to the second network domain by writing the reachability information and data encapsulation capabilities of the first host to a central controller database of the second network domain in accordance with at least one of the API and the database schema of the second network domain;
    obtaining a second message comprising reachability information and data encapsulation capabilities of a second host connected to a second tunnel endpoint in the second network domain, wherein the reachability information and data encapsulation capabilities of the second host are encoded in accordance with at least one of the API and the database schema of the second network domain;

extracting from the second message the reachability information and data encapsulation capabilities of the second host;

encoding the reachability information and data encapsulation capabilities of the second host in accordance with the control plane protocol of the first network domain; and providing the second message to the first network domain.

5. The media of claim 4, wherein the providing the second message comprises:

advertising the reachability information and data encapsulation capabilities of the second host in the first network domain in accordance with the control plane protocol.

6. The media of claim 4, wherein the first network domain comprises a distributed network protocol-based network.

7. An apparatus comprising:

a memory element configured to store data;

a processor operable to execute instructions associated with the data; and a translator configured to:

obtain a first message comprising reachability information and data encapsulation capabilities of a first host connected to a first tunnel endpoint in a first network domain, wherein the reachability information and data encapsulation capabilities of the first host are encoded in accordance with a control plane protocol of the first network domain;

extract from the received first message the reachability information and data encapsulation capabilities of the first host;

encode the reachability information and data encapsulation capabilities of the first host in accordance with at least one of an Application Programming Interface (API) and a database schema of a second network domain;

provide the first message to the second network domain by writing the reachability information and data encapsulation capabilities of the first host to a central controller database of the second network domain in accordance with at least one of the API and the database schema of the second network domain;

obtain a second message comprising reachability information and data encapsulation capabilities of a second host connected to a second tunnel endpoint in the second network domain, wherein the reachability information and data encapsulation capabilities of the second host are encoded in accordance with at least one of the API and the database schema of the second network domain;

extract from the second message the reachability information and data encapsulation capabilities of the second host;

encode the reachability information and data encapsulation capabilities of the second host in accordance with the control plane protocol of the first network domain; and provide the second message to the first network domain.

8. The apparatus of claim 7, wherein the translator is further configured to provide the second message by advertising the reachability information and data encapsulation capabilities of the second host in the first network domain in accordance with the control plane protocol.

9. The apparatus of claim 7, wherein the first network domain comprises a distributed network protocol-based network and the second network domain comprises a central controller-based network.

10. The method of claim 1, wherein the second network domain comprises a central controller-based network.

11. The media of claim 4, wherein the second network domain comprises a central controller-based network.

12. The method of claim 1, wherein extracting the reachability information and data encapsulation capabilities of the first host includes periodically extracting the reachability information and data encapsulation capabilities of the first host.

13. The method of claim 1, wherein extracting the reachability information and data encapsulation capabilities of the second host includes periodically extracting the reachability information and data encapsulation capabilities of the second host.

14. The media of claim 4, wherein extracting the reachability information and data encapsulation capabilities of the first host includes periodically extracting the reachability information and data encapsulation capabilities of the first host.

15. The media of claim 4, wherein extracting the reachability information and data encapsulation capabilities of the second host includes periodically extracting the reachability information and data encapsulation capabilities of the second host.

16. The apparatus of claim 7, wherein the translator is configured to periodically extract the reachability information and data encapsulation capabilities of the first host.

17. The apparatus of claim 7, wherein the translator is configured to periodically extract the reachability information and data encapsulation capabilities of the second host.

18. The method of claim 1, wherein extracting from the second message the reachability information and data encapsulation capabilities of the second host includes extracting from the second message the reachability information and data encapsulation capabilities of the second host in response to a trigger obtained from a central controller of the second network domain.

19. The media of claim 4, wherein extracting from the second message the reachability information and data encapsulation capabilities of the second host includes extracting from the second message the reachability information and data encapsulation capabilities of the second host in response to a trigger obtained from a central controller of the second network domain.

20. The apparatus of claim 7, wherein the translator is configured to extract from the second message the reachability information and data encapsulation capabilities of the second host in response to a trigger obtained from a central controller of the second network domain.

* * * * *

UNITED STATES PATENT AND TRADEMARK OFFICE
CERTIFICATE OF CORRECTION

PATENT NO. : 10,476,700 B2
APPLICATION NO. : 15/228899
DATED : November 12, 2019
INVENTOR(S) : Victor Manuel Moreno et al.

It is certified that error appears in the above-identified patent and that said Letters Patent is hereby corrected as shown below:

In the Claims

Claim 2, Column 12, Line 27, please replace "wherein the providing" with --wherein providing--

Claim 5, Column 13, Line 9, please replace "wherein the providing" with --wherein providing--

Claim 7, Column 13, Line 29, please replace "the received first message" with --the first message--

Signed and Sealed this
Eleventh Day of February, 2020

Andrei Iancu
*Director of the United States Patent and Trademark Office*